United States Patent [19]
Runne

[11] Patent Number: 5,669,714
[45] Date of Patent: Sep. 23, 1997

[54] TEMPERATURE SENSOR ADAPTOR FOR MEASURING THE TEMPERATURE OF A SPARK PLUG

[76] Inventor: Edward Runne, 94 New York Ave., Lake Hopatcong, N.J. 07849

[21] Appl. No.: 509,220

[22] Filed: Jul. 31, 1995

[51] Int. Cl.⁶ .................... G01K 1/14; G01K 7/04
[52] U.S. Cl. .................... 374/208; 374/144; 374/179; 136/229; 136/232
[58] Field of Search .................... 374/208, 144, 374/179; 123/198 D; 136/229, 232, 233

[56] References Cited

U.S. PATENT DOCUMENTS

| | | | |
|---|---|---|---|
| 1,084,838 | 1/1914 | Beck | 374/144 |
| 1,952,626 | 3/1934 | Johnson | 374/144 |
| 2,000,489 | 5/1935 | Lederer | 374/144 |
| 3,940,987 | 3/1976 | Green et al. | 374/144 |
| 4,361,036 | 11/1982 | Levenson | 374/144 |
| 4,446,723 | 5/1984 | Bonning et al. | 374/144 |
| 4,984,905 | 1/1991 | Amano et al. | 374/144 |
| 5,024,534 | 6/1991 | Matsubara et al. | 374/144 |

*Primary Examiner*—Diego F. F. Gutierrez
*Attorney, Agent, or Firm*—John B. Dickman, III

[57] ABSTRACT

A spark plug temperature sensor adaptor which is removably attached to a spark plug to provide a temperature reading of conditions in an internal combustion engine cylinder. The temperature sensor adaptor has a hollow cylindrical shape with a hexangular cross-section to mate with the hexangular shape of a spark plug and a thermocouple to sense the temperature of a spark plug.

4 Claims, 1 Drawing Sheet

TEMPERATURE SENSOR ADAPTOR FOR MEASURING THE TEMPERATURE OF A SPARK PLUG

BACKGROUND OF THE INVENTION

The invention relates to the field of temperature sensors for spark plugs of an internal combustion engine, and more particularly, to a temperature sensor adaptor which is removably attached to a spark plug as an indication of a cylinder's operation.

It is shown that a measure of a spark plug's temperature can be used to approximate and monitor such cylinder operation, as correct gas mixture, intake temperature, ignition timing, revolution speed and exhaust pressure.

One example of a spark plug having a temperature sensor, is U.S. Pat. No. 5,024,534, where a thermocouple is embedded near the front end of the center electrode of a spark plug and connect to a digital-optical converter to give an output representing the spark plug temperature. A disadvantage of having the thermocouple embedded in the spark plug is the thermocouple must be manufactured as part of the spark plug and can not, therefore, be reused with other spark plugs. This arrangement raises the cost of a spark plug and requires that each spark plug must be equipped with a temperature sensor to test all the cylinders.

An example of a removable thermocouple device is shown in U.S. Pat. Nos. 1,972,146 and 1,952,626 where a pair of mating washers having annular grooves receive a thermocouple, and the mated washers are positioned on a spark plug between a flange and the engine block. The thermocouple device is not designed for removal without first removing the spark plug. In addition, the thermocouple does not have direct contact with the metal base of the spark plug. The thermocouple, in fact, is wrapped around the base of the spark plug which may result in a false reading.

Other U.S. Patents directed to a spark plug with a temperature sensor are U.S. Pat. Nos. 3,940,987, 4,361,036 and 4,984,902. In each of these patents, a thermocouple is embedded in the spark plug during manufacture to measure the spark plug temperature exposed to the engine cylinder.

DESCRIPTION OF THE INVENTION

Figure 1:
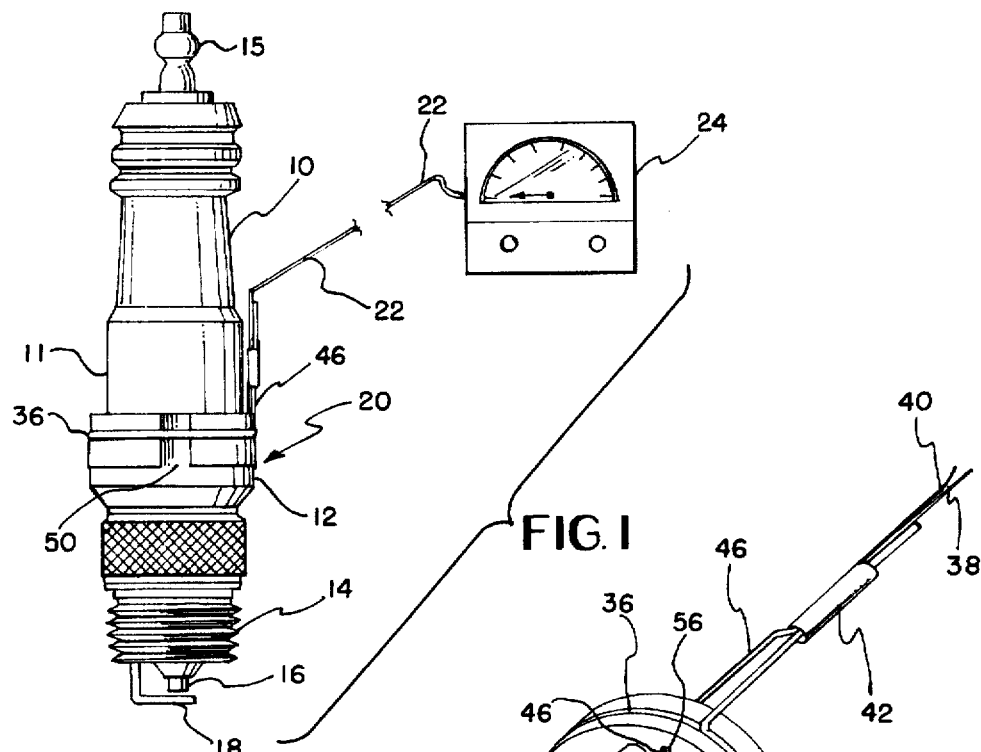
FIG. 1 is a side elevation of a spark plug and the temperature sensor adaptor of the invention.
Figure 2:
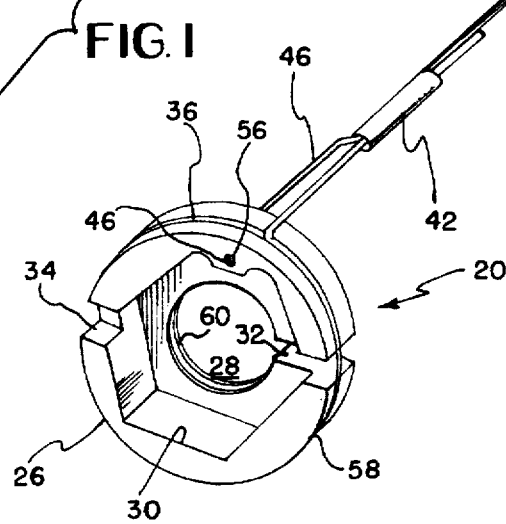
FIG. 2 is a perspective view of a temperature sensor adaptor of the invention.
Figure 3:
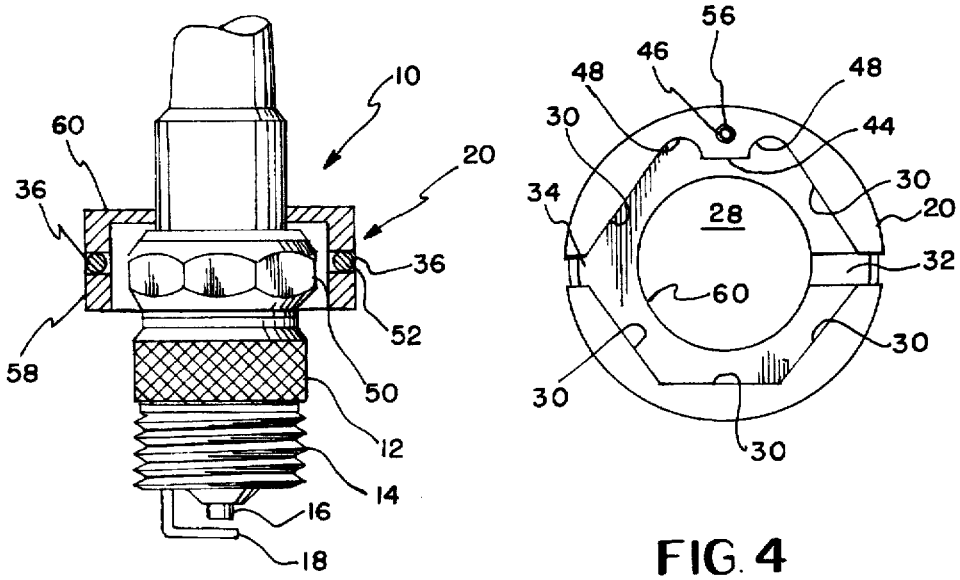
FIG. 3 is a partial perspective of a spark plug and a cross-section of a temperature sensor adaptor.

Referring to the drawings, FIGS. 1–4, there is shown, in FIG. 1, a spark plug 10 of known construction having a ceramic body 11 bonded to a metal body 12 to prevent moisture from causing interference with an electrode which extends from an end cap 15 to an electrode end 16. The metal body 12 has a hexangular portion 50 to receive a spark plug socket for tightening and loosening the spark plug 10. Metal body 12 has a ground electrode 18 spaced from electrode 13 to produce a spark when an electrical current is present. Removably mounted on spark plug 10 is a temperature sensor adaptor 20, shown in FIG. 1 and FIG. 3 on spark plug 10. The purpose of temperature sensor adaptor 20 is to receive temperature variations and send the variations to a measuring device 24 for reading. FIG. 1 shows a metal spring ring 36 on temperature sensor adaptor 20 encircling said temperature sensor adaptor 20 in groove 52, as shown in FIG. 3, and having a vertical post means 54 attached thereto. A thermocouple 46 is fastened to vertical post means 54 by a sleeve 42. The end of thermocouple 46 is bonded in aperture 56 to receive temperature variations and held in place by metal spring ring 36. Connected to thermocouple 46, are thermocouple leads 22, which connect to measuring device 24 via wires 38 and 40, as shown in FIG. 2.

Figure 4:
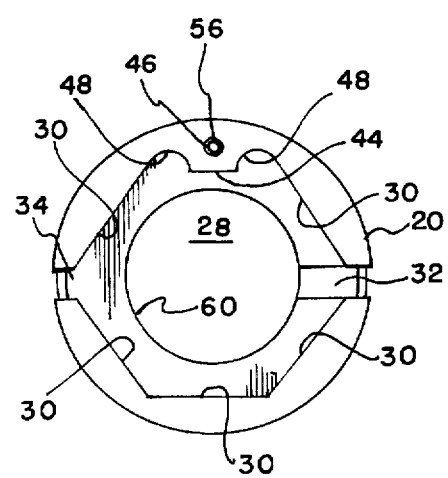
FIG. 4 is a bottom end plan view of a temperature sensor adaptor of the invention.

The structure of the thermocouple sensor adaptor 20 is best shown in FIGS. 2 and 4. The temperature sensor adaptor 20 has a cylindrical wall 58 and an integral top 60. An aperture 28 in top 60 centers the adaptor 20 on a spark plug 10. The interior of the adaptor 20 is hollow and has hexangular cross-section shaped walls 30. To provide a heat contact point, one wall of the hexangular cross-section walls has a pair of arcuate depressions 48 with a projection 44 that makes point contact with a wall of the hexangular portion 50 of spark plug 10. By having a focal point projection 44, the thermocouple 46 will pick-up more accurate sensing of the spark plug temperature, compared to sensing a temperature range over a broad surface of a wall 30 which would be the case if no depressions were present. That is, the arcuate depressions reduce the size of the contact point that is in contact with the spark plug. As explained, thermocouple 46 is bonded in aperture 56 located in projection 44. There is a notch 34 between two of the walls 30, and a cut-out 32 in between two walls 30. Notch 34 and cut-out 32 serve to limit thermal heat from circulating through the walls 30 to projection 44.

In use, with the spark plug 10 installed in an internal combustion engine, not shown, the temperature sensor adaptor 20 is slipped over ceramic body 11 and positioned on metal body hexangular portion 50, with projection 44 pressed against one of the walls of hexangular portion 50. Heat produced from the explosion of a fuel-air mixture in the engine cylinder is transmitted by convection through the spark plug metal body 12 to thermocouple 46.

While only one embodiment of the invention is shown, it is understood that other embodiments may be realized; therefore, one should study the drawings, description and claims for a complete understanding of the invention.

I claim:

1. A removable temperature sensor adaptor in which a thermocouple is embedded in an adaptor means to make thermal contact with a spark plug of the type having a metal body portion with a hexangular wall section; said adaptor means having a cylindrical body, a top with an aperture to fit on the spark plug on one end of said cylindrical body, said cylindrical body being open at its other end, said cylindrical body having a cavity, where said cavity is surrounded by a plurality of walls having a hexangular shape adapted to removably mate with the hexangular wall section of the spark plug; a spark plug contact point in one of said walls of said cavity, said thermocouple being embedded in an aperture in said spark plug contact point to sense the temperature of the spark plug at said spark plug contact point, said thermocouple being supported on said adaptor means by a metal spring ring which encircles said cylindrical body, said thermocouple being further supported by a vertical post means extending from said metal spring ring, said cylindrical body having a circumferential groove to receive said metal spring ring, and wherein said vertical post means has a sleeve means for fastening said thermocouple to said vertical post means.

2. A removable temperature sensor adaptor as in claim 1 wherein said cylindrical body has at least one notch means extending between adjacent walls of said plurality of walls to reduce heat transfer from said walls to said spark plug contact point.

3. A removable temperature sensor adaptor as in claim 2 wherein said cylindrical body further has a cut-out means between adjacent walls of said plurality of walls opposed to said notch means.

4. A removable temperature sensor adaptor as in claim 3 wherein said spark plug contact point that is formed in one of said walls has arcuate depressions on either side of said spark plug contact point to reduce the spark plug.

* * * * *